INVENTOR:
RICHARD J. LIPINSKI

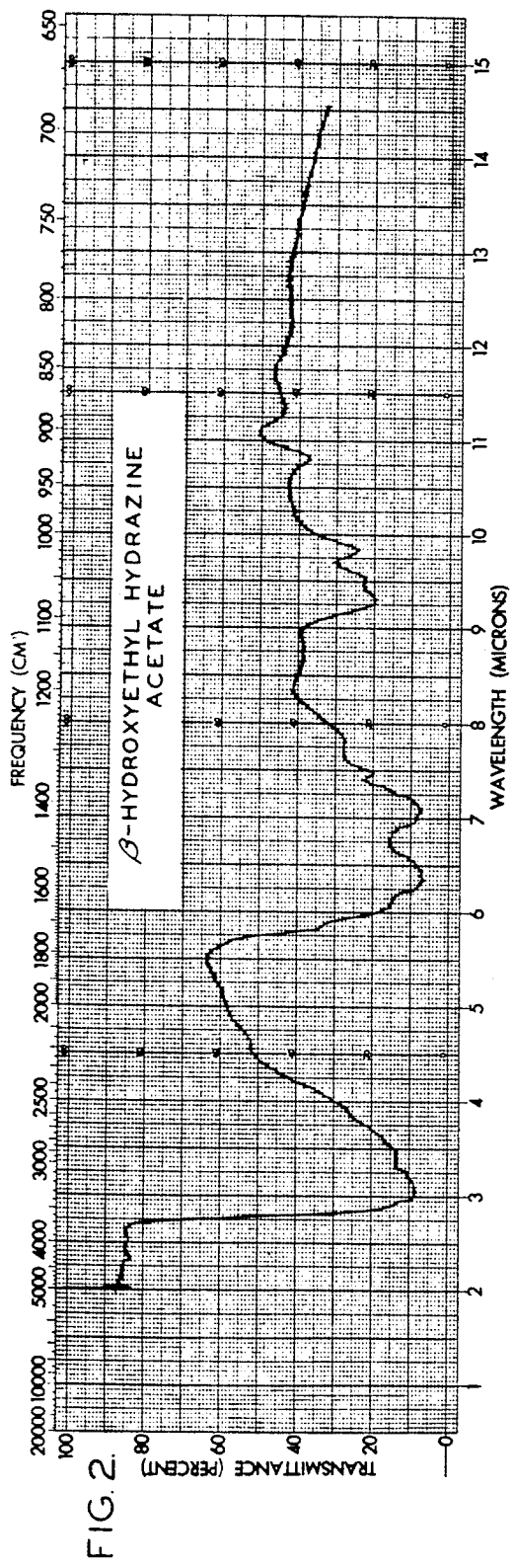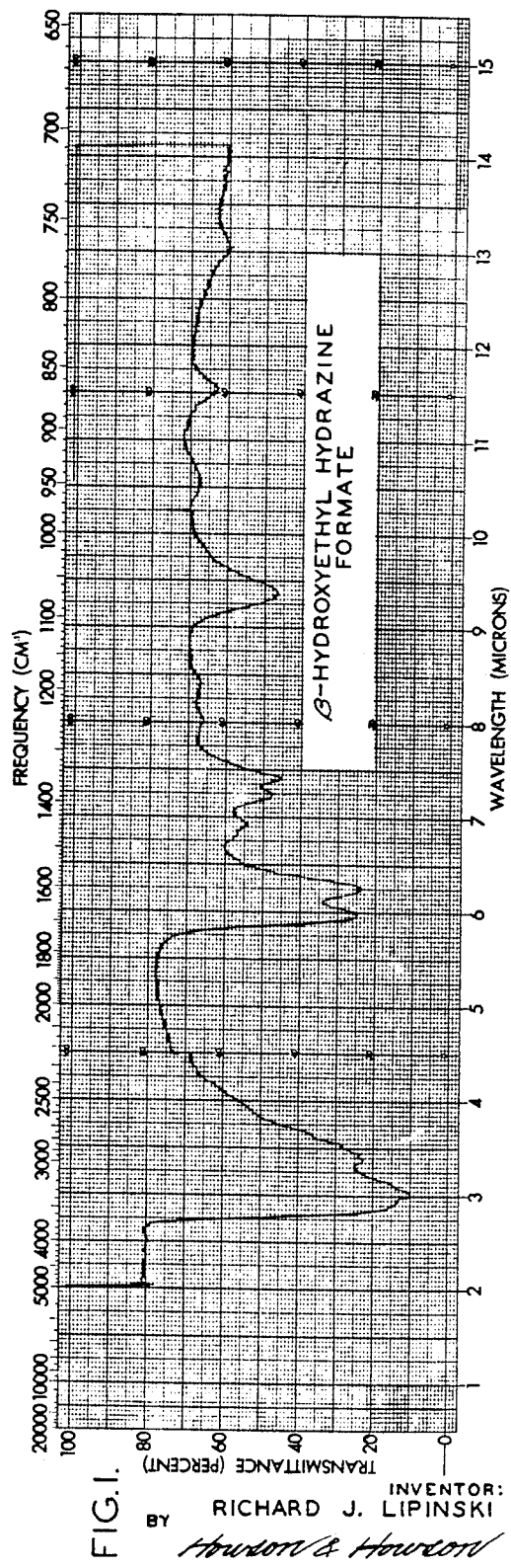

United States Patent Office 3,380,860
Patented Apr. 30, 1968

3,380,860
TREATMENT OF ALUMINUM, COMPOSITIONS
THEREFOR AND PRODUCTS THEREOF
Richard J. Lipinski, Erie, Pa., assignor to Lord Corporation, a corporation of Pennsylvania
Filed Jan. 27, 1964, Ser. No. 340,151
35 Claims. (Cl. 148—6.27)

ABSTRACT OF THE DISCLOSURE

Aluminum is treated with an acid solution of salts of certain ammonia derivatives and certain acids at a temperature between 75° C. and boiling to provide essentially pure boehmite. In the treatment of an aluminum surface, the surface is preferably substantially free of oxide as by being pretreated with hot water containing a sulfuric acid, chromate ions and borate ions.

---

Figure 3:
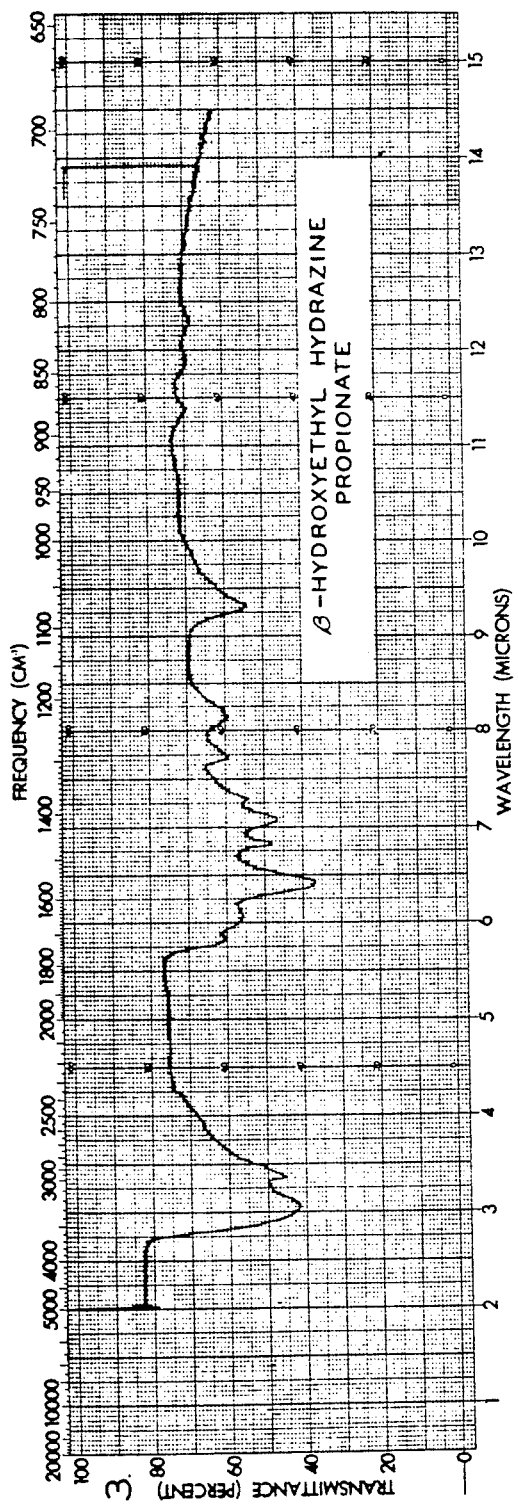

The present invention relates to the chemical production of a protective film on an aluminum surface; and more particularly, it relates to an improved method for producing a boehmite film on an aluminum surface, including, in one embodiment, a preliminary treatment of the aluminum surface. The invention also relates to novel compositions of matter particularly useful in the methods of the invention and to novel articles comprising certain aluminum alloys having an essentially pure boehmite film thereon. As will appear hereinafter, the invention is also applicable to the production of essentially pure boehmite as such where this material unassociated with an aluminum surface is the desired end product. In another embodiment the present treatment may also be used in sealing porous anodic oxide coatings on aluminum.

It is known to produce a boehmite-containing film on an aluminum surface. Boehmite is hard, crystalline, water-insoluble AlOOH, generally known as gamma-AlOOH and sometimes referred to as α-alumina monohydrate. Basically, the method of producing the boehmite film involves treating the aluminum surface with hot (usually above 75° C.) or boiling water or steam. In modifications of this procedure, sodium hydroxide, sodium carbonate, ammonium hydroxide or triethanolamine, has been included in the water to render it alkaline; or an acid, like acetic acid or nitric acid, has been included in the water to render it acid. One of the principal drawbacks of these procedures is the length of time, usually a matter of an hour or more, required to achieve the full effect of the treatment. In an attempt to shorten the time of treatment, it has been suggested to include an alkaline earth metal oxide, hydroxide or carbonate in the water. Another principal drawback of these procedures is that the beneficial protective results thereof are limited to aluminum containing less than 0.2% of any one of copper, silicon or manganese, that is to commercially pure aluminum or specialty aluminums of high purity.

Boehmite films produced by the foregoing procedures are translucent or even milky in appearance so that it is difficult to retain the original clean metallic appearance of the aluminum surface. This translucent or milky appearance is due to the occlusion of other, foreign oxides or salts in the boehmite film.

Boehmite films are to be distinguished from other chemically produced films on aluminum. For example, another way of providing a protective coating or film on aluminum is by the conversion coating method. In this method the aluminum is immersed in an acidic fluoride bath containing other compounds, like chromates, which react with the aluminum to form a coating thereon. Since such a coating is generally colored, the coating may be treated further to bleach out the color, as by reducing hexavalent chromium in the coating to trivalent form. These conversion coatings are non-crystalline.

OBJECTS

It is the principal object of the present invention to provide an improved method for producing a boehmite film on an aluminum surface.

It is another object of the present invention to provide a method for producing a boehmite film on an aluminum surface in a matter of minutes.

A further object of the present invention is to provide a method for producing a film of essentially pure boehmite on an aluminum surface, which film is clear, transparent and colorless thereby retaining the clean, lustrous, metallic appearance of the aluminum surface.

Still another object of the present invention is to provide a method for producing a boehmite film on a surface of an aluminum containing over 0.2% of any one of copper, silicon and manganese, which boehmite film provides corrosion resistance to such aluminum markedly superior to that provided by prior boehmite films on such aluminum.

Still another object of the present invention is to provide a method for producing a boehmite film on a surface of an aluminum containing over 0.2% of any one of copper, silicon and manganese which film, in addition to its high corrosion resistance is clear, transparent and colorless being composed essentially of pure boehmite.

A further object is to provide novel compositions of matter especially adapted for use in the boehmite-producing treatment of the present invention.

A further object of the present invention is to provide a method of, and a composition for, pretreating the aluminum surface before subjecting it to a boehmite film-producing chemical treatment whereby the ultimate boehmite film has improved properties, particularly corrosion resistance on aluminum surfaces containing over 0.2% of any one of copper, silicon and manganese.

Another object is to provide as articles of manufacture, surfaces of aluminum containing over 0.2% of any one of copper, silicon and manganese having thereover a clear, tranparent, colorless film consisting essentially of pure boehmite.

Still another object is to provide a novel method of sealing porous anodic oxide coatings on aluminum.

These and other objects will become apparent from a consideration of the following specification and the claims.

STATEMENT OF INVENTION

The process of the present invention for producing boehmite comprises contacting an aluminum surface with water, at a temperature between 75° C. and boiling, containing a small effective amount of a salt of:

(1) an ammonia derivative selected from the group consisting of ammonium hydroxide, hydrazine, hydroxylamine and basic amines which, at a concentration of whichever is the least of 0.1 molar and saturation, are capable of:
    (a) producing, in said water, a pH of at least 7.2 and of
    (b) increasing the reduction potential of said water by at least 30 millivolts; and
(2) A water-soluble monobasic acid;

the reuslting solution having a pH, by virtue of monobasic acid present therein, of below 7 but not substantially below 4, until boehmite is formed. This treatment will be referred to hereinafter as the "boehmite-producing process."

An especially valuable material for use in accordance with the boehmite-producing process is a salt of β-hydroxyethylhydrazine and a monobasic acid, particularly a lower fatty acid or an aliphatic monosulfonic acid. Such a salt may be made up into a concentrated aqueous solution for subsequent addition to water.

FIGURES 1–4 are infrared spectrograms of the salts of β-hydroxyethylhydrazine and formic acid, acetic acid, propionic acid and methane sulfonic acid, respectively.

In another aspect of the invention, the aluminum surface is pre-treated, to remove oxide film therefrom and to inhibit reformation of oxide thereon before the above-mentioned boehmite-producing treatment by a method which comprises contacting the aluminum surface with a hot aqueous acid solution containing small effective amounts of sulfonic acid, anions containing a hexavalent metal from Group V or VI, especially chromate ions and borate ions until oxide is removed from said aluminum surface. This treatment will be referred to hereinafter as the "pretreatment process."

An especially valuable composition for use in accordance with the pretreatment process is a dry mixture of solid, finely-divided water-soluble sulfonic acid; solid, finely-divided water-soluble chromate (including chromic acid), and solid, finely divided borate (including boric acid).

According to the broader aspects of the invention, the boehmite-producing process of the invention may follow any desired preliminary preparatory treatment of the aluminum and the above-mentioned pretreatment process of the invention may precede any desired method of producing boehmite, since advantages will be realized by employing either of the processes. However, particularly outstanding results are obtained when the pretreatment process of the invention and the boehmite-producing process of the invention are used in succession in conjunction with each other.

The term "aluminum" as used herein and in the claims includes pure aluminum, commercial aluminum containing small amounts of impurities and aluminum alloys in which aluminum predominates. Thus, the present process is applicable to the treatment of aluminum alloys containing over 0.2% of any one of copper, silicon and manganese which has not been the case with prior methods for forming boehmite films. In this regard a novel article of manufacture provided by the present invention comprises aluminum containing over 0.2% of any one of copper, silicon and manganese and having thereover a clear, transparent, colorless film consisting essentially of pure boehmite.

The structure of the aluminum is not material as far as the present invention is concerned. It may be in the form of a layer or film on a dissimilar base, such as another metal or non-metal. The aluminum subjected to the process may also be in powdered or flake form, and may be entirely consumed in the boehmite-producing process to provide a product consisting essentially of the pure boehmite.

By the boehmite-producing process of the present invention, boehmite can be produced in a matter of minutes. Moreover, the boehmite film produced is not colored, milky or translucent in appearance, but is clear, transparent and colorless thereby preserving the initial, clean, lustrous, metallic appearance of the underlying aluminum surface. At the same time, the corrosion resistance provided by the resulting boehmite film is better than boehmite films produced by prior methods. More striking is the improvement in corrosion resistance provided by the present process on aluminum alloys as compared to prior methods which, as stated, provided poor corrosion resistance when applied to aluminum alloys. The present boehmite film also provides good hiding power to subsequently applied paints, lacquers and other protective and decorative coatings, which hiding power is substantially greater than is the case with untreated aluminum surfaces. The present boehmite film also presents good adhesion to subsequently applied protective and decorative coatings, like paint and lacquer and to adhesives, and this is often significantly greater than that presented by prior boehmite films. While the foregoing is generally applicable to the boehmite-producing process without regard to a particular preliminary preparatory treatment for removing oxide, it is especially applicable to the conjoint use of the present pretreatment process with the present boehmite-producing process.

PRETREATMENT

Before subjecting the aluminum surface to the boehmite-producing process of the present invention, it is highly desirable that the aluminum surface be clean and substantially free of oxide. Hence, the aluminum surface may initially be cleaned by any one of a number of well known treatments to remove oil- or grease-containing films resulting from the manufacture and handling of the aluminum. For example, the aluminum surface may be cleaned with organic solvents or alkaline aqueous solutions of detergents. Following the cleaning operation, the aluminum surface may be rinsed with water.

For removal of oxide from the aluminum surface, the aluminum surface may be treated with an aqueous solution of an acid or alkali capable of oxide removal without leaving an insoluble residue. Such acids include nitric acid, a sulfonic acid, and the like, and such alkalis include sodium hydroxide, sodium carbonate, and the like. In accordance with preferred practice, however, substantially all of the oxide is removed from the aluminum surface and in a manner which inhibits its reformation prior to the time the aluminum surface is subjected to the boehmite-producing process.

This is accomplished according to the present invention by contacting the aluminum surface with a hot aqueous solution containing small effective amounts of a sulfonic acid, anions containing a hexavalent metal from Group V or VI, especially chromate ions, and borate ions, until the oxide is removed from the aluminum surface.

With respect to the sulfonic acid, this will, of course, be water soluble, and will preferably be one that is solid at temperatures up to about 100° F. The sulfonic acid may have a substituent or substituents in addition to the sulfonic acid group or groups, and such substituents may be, for example, halogen, hydroxy, carboxy, nitro, cyano, and the like. The sulfonic acid should also provide a pH in water below 4, preferably below 3. Examples of suitable sulfonic acids are- p-toluene sulfonic acid, 2,5-dimethyl benzene sulfonic acid, 2,5-dichlorobenzene sulfonic acid, 5-sulfosalicyclic acid, 2-naphthalene sulfonic acid, 2-amino-5-chloro-4-methyl benzene sulfonic acid, o-sulfobenzoic acid, 5-nitro-o-toluene sulfonic acid, p-nitrobenzene sulfonic acid, 2-chloro-5-nitrobenzene sulfonic acid, and the like. These illustrative sulfonic acids are dry solids at temperatures up to 100° F and can, therefore, be employed to make up dry, solid, compositions for subsequent addition to water.

Chromate ions can be provided by a chromic acid compound, such as chromic acid itself or an alkali metal chromate, like sodium chromate, sodium dichromate, potassium chromate and potassium dichromate. All these chromic acid compounds, in addition to being water-soluble, exist as dry solids at temperatures up to 100° F and can, therefore, be employed to make up dry, solid compositions for subsequent addition to water.

The same is true of boric acid compounds such as boric acid itself and the alkali metal borates, like sodium borate and potassium borate, which can be added in dry, solid form to the water to provide the borate ions.

The bath for the pretreatment process is preferably prepared by adding to water a mixture, in dry, solid, finely divided (powder) form, of the sulfonic acid, chromic acid compound and boric acid compound. In such a mixture the three principal ingredients will generally be present as follows: sulfonic acid between about 45 and about 96%, chromic acid compound between about 1 and about 25%, and boric acid compound between about 3 and about 30%.

these figures being in percent by weight, based on the total weight of the three.

In preparing the bath for use in the pretreatment process, the above-described composition can be added to water in a concentration on the order of about 0.3 to about 5%, by weight, based on the weight of the bath. The bath should also have a low pH between about 0.5 and about 2, provided by the sulfonic acid itself or in conjunction with nitric acid which may be added to the bath in an amount to provide the desired pH.

The bath should also be heated to an elevated temperature (above room temperature). Although the bath may be at boiling, no significant advantage is gained above 200° F. A particularly suitable bath temperature is between about 150 and 170° F.

The aluminum surface may be contacted with the pretreatment bath by immersion, spraying, and the like, until the oxide originally present on the aluminum surface has been removed. This point, which is generally reached between 0.5 to 3 minutes, is well known to those skilled in the art.

Following the pretreatment process, the aluminum surface may be rinsed with water.

BOEHMITE-PRODUCING PROCESS

Referring then to the boehmite-producing process of the present invention, as stated previously the process involves contacting the aluminum surface with an aqueous solution of a defined salt of an ammonia derivative and a monobasic acid. Such a salt may be added as such to the water to make up the treating bath, or it may be formed in situ in the treatment bath by the addition of the appropriate derivative of ammonia and of the monobasic acid.

Referring to the ammonia derivative portion of the salt, this component must have certain characteristics. It must be basic; that is, it must be capable of providing in water a pH of at least 7.2. The upper limit of the pH that could be provided by this component is not critical since in use it is in the form of a salt and is thus substantially neutralized. In addition, this component must be capable of increasing the reduction potential of the water of the treating bath by at least 30 millivolts. This characteristic will be discussed more in detail hereinafter. It will be realized that the foregoing characteristics are given as simple arbitrary tests for defining the ammonia derivative component of the salt, and that once a particular ammonia derivative has been selected on the basis of these characteristics, no further resort to such tests need be had. Actually, ample examples of suitable ammonia derivatives having these characteristics are given herein as to render it unnecessary for one interested in practicing the present boehmite-producing process to resort to these tests.

Ammonium hydroxide, hydrazine and hydroxylamine are ammonia derivatives which possess the foregoing characteristics and which are, therefore suitable for use according to the present invention. There also may be used, amines which possess the foregoing characteristics. So long as the amine has the foregoing characteristics, which also implies that it has at least some solubility in water, it will be suitable, as far as is presently known, for use in accordance with the present invention. The term "amine" as used herein refers to a compound derived from ammonia in which a hydrogen or hydrogens thereof are substituted by an organic radical or radicals. Amines of various types have been used, and these include open-chain amines and cyclic amines, as well as primary-, secondary- and tertiary-amines. Examples of such amines are ethylenediamine, ethanolamine, diethanolamine, triethanolamine, guanidine, β-hydroxyethylhydrazine, trishydroxymethylaminoethane, aniline, melamine, morpholine, piperidine, and the like.

As stated, the ammonia derivative from which the salt is formed will be capable of increasing the reduction potential of the water used in making up the treatment bath by at least 30 millivolts. The preferred ammonia derivatives increase the reduction potential by at least 200 millivolts. The increase in reduction potential of any particular ammonia derivative can readily be determined by well known procedures. In the table set forth below are given reduction potentials of a common tap water, deionized water and of solutions, in the deionized water, of exemplary ammonia derivatives applicable for use in salt form, in accordance with the present invention. In measuring these reduction potentials, 200 ml. of water or solution, at 20° C., were employed. With the ammonia derivatives set forth in the table, the concentration thereof in the solutions was 0.1 molar. However, where the ammonia derivative is not soluble in water to the extent of 0.1 molar, the measurement may be made at its saturation concentration which should, in any event, be at least 0.001 molar. Thus, the reduction potential measurement may be made at a concentration of whichever is the least of 0.1 molar and saturation. A high impedance vacuum type voltmeter was employed to measure the reduction potential in millivolts, the positive lead being attached to a platinum electrode and the negative lead being attached to a normal calomel electrode. The electrodes were spaced 2.5 cm. apart. The final readings of reduction potential, set forth in the table below, are at equilibrium; that is, when the readings on the voltmeter reach a constant value. The reduction potential values in the table are set forth in order of the increasing magnitude; that is, as one proceeds down the table the reduction potential becomes greater.

|  | pH | Reduction Potential (mv.) |
| --- | --- | --- |
| Tap water alone | 7.4-7.7 | +275 |
| Deionized water alone | 6.4 | +215 |
| Aniline | 7.2 | +185 |
| Melamine | 7.8 | +140 |
| Morpholine | 10.1 | +15 |
| Ammonium hydroxide | 11.1 | −13 |
| Ethylenediamine | 11.7 | −27 |
| Diethanolamine | 10.3 | −39 |
| Ethanolamine | 10.7 | −45 |
| Piperidine | 12.2 | −80 |
| β-Hydroxyethylhydrazine | 9.1 | −290 |
| Hydrazine | 9.6 | −430 |

As seen from the foregoing, the ammonia derivatives applicable for use, in the form of their defined salts, in accordance with the boehmite-producing process of the present invention differ somewhat as to their ability to increase the reduction potential of the water to which they are added. Nevertheless, as will be seen from the examples set forth hereinafter, even an ammonia derivative like aniline, which increases the reduction potential of the deionized water by 30 millivolts, provides improvement over the use of the deionized water alone. Likewise, the use of an ammonia derivative, in the form of its defined salt, in tap water will represent an improvement over the use of the tap water alone so long as that ammonia derivative as such will increase the reduction potential of the tap water by at least 30 millivolts. Thus a particular ammonia derivative may increase the reduction potential of the tap water given above to, say, 225. Even though this reduction potential would not be as great as that of deionized water alone, it will be seen that the present invention,- nevertheless, provides an improvement over the use of tap water alone where for one reason or another, i.e. economy, tap water is selected. Generally the greater the reduction potential increase producible by an ammonia derivative, the more effective is that ammonia derivative in salt form, in accordance with the boehmite-producing process of the present invention. It is for this reason that the preferred ammonia derivatives are those capable of increasing the reduction potential of the water by at least 200 millivolts. As seen from the foregoing table, those ammonia derivatives from morpholine on down in the column, fall into this preferred group. It will also be realized that the foregoing reduction potential figures are not absolute, since they can vary somewhat depending upon the source of the tap water and/or deionized water, as well as upon the equipment used for the measurement. The important consideration is one of relativity in improving the ability of the particular water available to provide boehmite films.

Referring further to the water used in making up the solution used in the boehmite-producing process, while tap water may be used, it is preferred to employ a more pure form of water, such as deionized water or distilled water. Deionized water, as is well known, is water which has been treated by ion exchange to remove excessive mineral ions therefrom. Such water, as well as distilled water, will normally have an ohmic resistance, due to the removal of ions, of at least 50,000 ohms per cubic centimeter. Water having an ohmic resistance of at least 100,000 ohms per cc. is especially preferred.

Referring to the acid component of the salt employed in accordance with the present invention, it will be a water-soluble monobasic acid; that is, an acid having but one hydrogen atom which can be replaced by a metal or positive radical. As will appear from the examples hereinafter set forth, the acid may be inorganic or organic, and, when organic, it will be aliphatic (monocarboxylic or monosulfonic) containing from 1 to 4 carbon atoms. The acid should not be strongly oxidizing, that is, it should have a reduction potential at least as great (equal to or more negative) as that of nitric acid. This can be measured in the same manner as discussed above with respect to the ammonia derivatives. The acid should also be one the aluminum salt of which is soluble in cold (room temperature) water and is decomposed by hot (150–212° F.) water. The acid inherently will also be free of substituents and unsaturation that would prevent salt formation with the particular ammonia derivative. Examples of such monobasic organic acids are nitric, hydrochloric, and the like acids. Example of such monobasic aliphatic monocarboxylic organic acids are the lower fatty acids (including derivatives thereof like the halo, cyano, alkyl and alkoxy substituted lower fatty acids containing a total of no more than four carbon atoms) such as formic, acetylformic, acetic, monochloroacetic, dichloroacetic, trichloroacetic, bromoacetic, cyanoacetic, methoxyacetic, propionic, monochloropropionic, dichloropropionic, trichloropropionic, 3-iodopropionic, 2-bromopropionic, n-butyric, isobutyric, 2-bromobutyric, and the like acids. Sulfonic acids, that is, acidic organic compounds in which a hydrogen atom is replaced by an $SO_2OH$ group, are also considered organic acids, and examples of aliphatic monosulfonic acids containing from 1 to 4 carbon atoms are: methane sulfonic, chloromethane sulfonic, trichloromethane sulfonic, ethane sulfonic, aminoethane sulfonic, n-propyl sulfonic, n-butyl sulfonic, and the like acids. Of the monobasic acids, the stated lower fatty acids, especially the acetic acids and propionic acids, are presently preferred. Trace amounts of other types of acid, like a polybasic acid, can be tolerated without noticeably interfering with the treatment. However, the content of such other type of acid should not exceed 5% of the monobasic acid content, so that the acid component of the treating bath will consist essentially of the defined monobasic acid.

In making up the treating bath or solution, the salt of the ammonia derivative may be added as such to the water or the salt may be formed in situ by the addition of the ammonia derivative and the monobasic acid. In commercial practice a concentrate of the salt may initially be prepared by dissolving the salt in or adding the ammonia derivative and monobasic acid to a limited amount of water, and such concentrate may subsequently be added to the water to make up the final treating solution. In any case, the pH of the actual treating solution will be adjusted to below 7. Where a salt as such is added, this may or may not require the addition of further monosufficient monobasic acid will be added to provide the desired pH. Where additional monobasic acid is added to adjust the pH, this acid may be different from the monobasic acid component of the salt. The pH of the treating solution should not be below 4. Preferred pH conditions are between about 5 and about 6.5. In accordance with conventional chemical technique, a buffering agent may be employed to help in maintaining the pH of the treating solution at the desired level.

Reference has been made above to the provision of a concentrate as a commercial composition for subsequent addition to water in making up the bath. A preferred concentrate in this regard is a solution, in deionized water, of a salt of β-hydroxyethylhydrazine and a monobasic acid, particularly a lower fatty acid, having a pH between 4 and 6 by virtue of free monobasic acid present therein. The concentration of the salt in such concentrate will be between about 10 and about 20%, by weight. Particularly preferred concentrates contain a formate, acetate or propionate of β-hydroxyethylhydrazine.

The ammonia derivative salt present in the treating solution will be effective in a small amount. As will appear from the examples set forth hereinafter, the exact effective concentration may depend upon the particular salt employed as well as the time available for treatment which in turn may depend upon the temperature of the solution. In general the use of low molecular weight salts, longer treating time and higher temperatures permits low concentrations of salt; whereas the use of high molecular weight salts, shorter treating times and lower temperatures requires higher concentrations. Thus with the foregoing in mind, the concentration of salt in the solution may be as low as about 0.01%, by weight. While, in some instances, in view of the factors discussed above, the concentration may go as high as about 5%, there is generally no need to exceed about 3%. Preferred concentrations range between about 0.1% and about 2%.

The temperature of the treating solution should be at least 75° C. and may go up to its boiling point. At the upper end of this temperature range, the treatment may be complete in as little as one minute whereas at the lower end of this temperature range the treatment may take as long as 20 minutes. Excessive times, while not necessary, are not detrimental since, once the boehmite film is formed, no further action takes place, and the aluminum surface could be left in contact with the treating solution for hours.

The aluminum surface may be contacted with the treating solution by immersing the aluminum therein or by applying the solution to the aluminum surface as by spraying or brushing. Preferred treatment involves either immersing the aluminum in the solution or spraying the solution on to the aluminum surface.

Following the treatment, the aluminum surface may be simply rinsed and dried. If desired, the treated aluminum may be subjected to further chemical treatment; for example, the common chromate rinse. It has been found that such a rinse improves the corrosion resistance of the boehmite film produced by the present process.

The following examples are given for the purpose of illustration only and are not intended to limit the scope of the invention in any way.

In the examples the aluminum and aluminum alloy panels treated are of the dimensions 0.020" x 3" x 6". Aluminum A is 99+% pure aluminum with traces of silicon, iron, copper, manganese and zinc (trade designation 1100); aluminum B contains 3.8–4.9% copper, 1.2–1.8% magnesium, 0.3–0.9% manganese, 0.5% silicon, 0.5% iron and smaller amounts of chromium and zinc, the remainder aluminum (trade designation 2024); and aluminum C contains 1.0–1.5% manganese, 0.7% iron, 0.6% silicon, 0.2% copper and smaller amounts of zinc, the remainder aluminum (trade designation 3003). The deionized water used has an ohmic resistance above 100,000 ohms per cc., and the tap water has an ohmic resistance of about 2,000 ohms per cc. Before any of the treatments set forth in Examples I through XXVII, the aluminum panels are first cleaned for 3 minutes in a bath, at 170° F., made up of: 1 liter of water, 31.9 grams of sodium carbonate, 63.8 grams of sodium tetraborate, 0.9 gram of the ethylene oxide addend of t-octyl phenol averaging 9–10 ethylene oxide units and 0.9 gram of a mixture of condensation products of polypropylene glycol and ethylene oxide—90% having a molecular weight of approximately 8000 and 10% having a molecular weight of approximately 1800. In Examples I–VII the panels are then subjected to the above-discussed oxide-removal and inhibition treatment before being subjected to the boehmite-producing process. In Examples I–VI this treatment involves immersing the panels for 2 minutes in a bath, at 160° F., made up of: 1 liter of water, 10 grams of 5-nitro-o-toluene sulfonic acid, 5 grams boric acid, 10 ml. conc. nitric acid, 3 grams of chromic acid and 1 gram of an ethylene oxide addend of t-octyl phenol averaging 9–10 ethylene oxide units. The treating solutions set forth in all the examples are at approximately 210° F. and, for treatment, the panels are immersed therein for the specified periods of time. As to the data set forth in the tables accompanying the examples: "Salt Spray Test" refers to ASTM B117–57 test for determining resistance to corrosion upon the application of salt water spray to the panels for 24 hours, and the figures are in pits per square inch except in Table III where they are in terms of an arbitrary relative rating in units from 1 to 8, with 1 being best and 8 poorest; "Tape Test" refers to the application of ¾" wide pressure sensitive cellophane tape ("Scotch" brand cellophane tape #600 of the Minnesota Mining and Manufacturing Co.) and then peeling away the tape. If there remains on the panel a film, representing substantially the area where the tape had been applied, of adhesive separated from the tape and adhered to the panel, the test is rated as "Pass" or "P," otherwise "Fail" or "F." "Percent Reflectivity" is measured by ASTM D523–53T, Fed. Test Method No. 141, Procedure 6103.

Example I

In this example the boehmite-producing process of the present invention is compared to treatment in tap water alone and in deionized water alone. Panels of aluminum B and of aluminum C are employed. The amine is β-hydroxyethyl hydrazine (providing an initial pH of 9.6) and adjusted to pH 6 using acetic acid forming β-hydroxyethyl hydrazine acetate. Various times of treatments in the solutions are used. The treated panels are observed for film appearance and are then subjected to the "Salt Spray Test" and to the "Tape Test," and the "Percent Reflectivity" of each panel is measured. The films produced using tap water or deionized water alone are translucent with a light gray cast, whereas the films formed in the β-hydroxyethylhydrazine acetate solutions are all clear, transparent and colorless and consist essentially of pure boehmite.

The results are set forth in the following table:

TABLE I

| Type of water | Tap | | | | Deionized | | | | Tap | | | | Deionized | | | |
|---|---|---|---|---|---|---|---|---|---|---|---|---|---|---|---|---|
| Amine | None | | | | None | | | | β-hydroxyethyl hydrazine | | | | β-hydroxyethyl hydrazine | | | |
| Amine Conc | 0 | | | | 0 | | | | .06M | | | | .06M | | | |
| Initial pH | 7.6 | | | | 4.5 | | | | 9.6 | | | | 9.3 | | | |
| Adjusted pH | 7.6 | | | | 4.5 | | | | 6.0 | | | | 6.0 | | | |
| pH Adjusting Acid | None | | | | None | | | | Acetic Acid | | | | Acetic Acid | | | |
| Aluminum Used | B | | C | | B | | C | | B | | C | | B | | C | |
| Treatment Time (Min.) | 5 | 10 | 5 | 10 | 5 | 10 | 5 | 10 | 5 | 10 | 5 | 10 | 5 | 10 | 5 | 10 |
| Salt Spray Test | 100 | 80 | 25 | 3 | 60 | 70 | 17 | 10 | 100 | 40 | 15 | 3 | 40 | 25 | 0 | 0 |
| Tape Test | F | F | F | F | P | P | P | P | P | P | P | P | P | P | P | P |
| Percent Reflectivity | 75 | 68 | 70 | 83 | 73 | 65 | 75 | 38 | 81 | 91 | 100 | 94 | 95 | 88 | 99 | 100 |

Example II

In this example the effect of variations in the pH of the treating solution is illustrated. Aluminum B is used, the amine is β-hydroxyethyl hydrazine and the pH adjusting acid is acetic acid. Treatment times of 10 and 20 minutes are used. The panels are subjected to the "Salt Spray Test" and "Tape Test," and the "Percent Reflectivity" is measured.

The results are set forth in the following table:

TABLE II

| Type of water | Deionized | Deionized | | | | | | | | | | |
|---|---|---|---|---|---|---|---|---|---|---|---|---|
| Amine | None | β-hydroxyethyl hydrazine | | | | | | | | | | |
| Amine Conc | 0 | .06M | | | | | | | | | | |
| Initial pH | 4.5 | 9.3 | | | | | | | | | | |
| Adjusted pH | 4.5 | 9.3 | | 8.0 | | 7.0 | | 6.0 | | 5.0 | | |
| pH Adjusting Acid | None | None | | Acetic | | Acetic | | Acetic | | Acetic | | |
| Treatment Time (Min.) | 10 | 20 | 10 | 20 | 10 | 20 | 10 | 20 | 10 | 20 | 10 | 20 |
| Salt Spray Test | 70 | 55 | 35 | 48 | 45 | 30 | 12 | 10 | 6 | 6 | 11 | 8 |
| Tape Test | P | P | F | F | F | F | P | P | P | P | P | P |
| Percent Reflectivity | 83 | 85 | 78 | 72 | 57 | 85 | 81 | 92 | 99 | 98 | 93 | 100 |

Example III

This example illustrates the effect of varying the concentration of amine salt at various treating times. Panels of aluminum B are used at all concentration levels; panels of aluminum C are used only at concentration levels of 0.1 to 0.3, and panels of aluminum A are used only at concentration levels of 0.5 to 2.0. In all cases at these concentrations from 0.1 to 2.0 the panels passed the Tape Test. The treating solutions are prepared from β-hydroxyethylhydrazine, at various concentrations, in deionized water, the pH of the solutions being adjusted to 6.0 with acetic acid.

The results are tabulated as follows:

TABLE II

| Conc. of Amine (percent by wt.) | Treatment Time (Min.) | Salt Spray Test (Rating Scale 8 to 1) Aluminum | | |
|---|---|---|---|---|
| | | A | B | C |
| 0.1 | 5 | | 4 | 1 |
| 0.1 | 10 | | 3 | 1 |
| 0.1 | 15 | | 1 | 1 |
| 0.3 | 5 | | 3 | 1 |
| 0.3 | 10 | | 2 | 1 |
| 0.3 | 15 | | 1 | 1 |
| 0.5 | 5 | 4 | | |
| 0.5 | 10 | 1 | 2 | |
| 0.5 | 15 | 1 | 1 | |
| 0.5 | 20 | 1 | 1 | |
| 1.0 | 5 | 1 | 7 | |
| 1.0 | 10 | 1 | 6+ | |
| 1.0 | 15 | 1 | 3 | |
| 1.0 | 20 | 1 | 3 | |
| 2.0 | 5 | 1 | 7 | |
| 2.0 | 10 | 1 | 7 | |
| 2.0 | 15 | 1 | 5 | |
| 2.0 | 20 | 1 | 4 | |

Example IV

This example illustrates the use of various amine acetates in deionized water, either added as such or formed in situ in the solution. In all cases the concentration of amine salt is 0.06 M. Where the salt is formed in situ only the name of the amine is given, it being understood that acetic acid is added to form the salt. The control bath using deionized water alone is adjusted to pH 6 with sodium hydroxide. The hydroxy ammonium acetate solution has a pH of 5.2; all other solutions are adjusted to pH 6 with acetic acid. Panels of aluminum B are used. The results are tabulated as follows:

TABLE IV

| Amine | Treating Time (Min.) | Tape Test | Percent Reflectivity | Salt Spray Test |
|---|---|---|---|---|
| None | 10 | F | 63 | 140 |
| Do | 20 | F | 60 | 115 |
| β-Hydroxyethylhydrazine | 10 | P | 93 | 6 |
| Do | 20 | P | 87 | 6 |
| Hydroxyammonium acetate | 10 | P | 100 | 120 |
| Do | 20 | P | 79 | 80 |
| Guanidine acetate | 10 | P | 93 | 30 |
| Do | 20 | P | 71 | 20 |
| Ethanolamine | 10 | P | 93 | 6 |
| Do | 20 | P | 86 | 8 |
| Triethanolamine | 10 | P | 100 | 7 |
| Do | 20 | P | 70 | 5 |
| Trishydroxymethylaminomethane | 10 | P | 100 | 12 |
| Do | 20 | P | 90 | 15 |
| Ammonium acetate | 10 | P | 76 | 17 |
| Do | 20 | P | 76 | 30 |
| Diethanolamine | 10 | P | 83 | 25 |
| Do | 20 | P | 90 | 12 |
| Ethylene diamine | 10 | P | 100 | 33 |
| Do | 20 | P | 96 | 20 |
| Hydrazine | 15 | P | 77 | 14 |

Example V

This example is similar to Example IV but illustrates the use of cyclic amines. Although only the name of the amine is given in the table below, it will be understood that acetic acid has been added to the solution, in deionized water, to form the corresponding acetic acid salt of the amine and to lower the pH to 6. The amine concentration is 0.06 M. Panels of aluminum B and of aluminum C are treated for times of 5 to 10 minutes.

The results are set forth in the following table.

Example VI

This example illustrates the use of amine salts of various acids and shows the inapplicability of polybasic acid salts. The amine used is β-hydroxyethylhydrazine in a concentration in deionized water of 0.06 M, and in each case the pH of the amine-containing solution is adjusted as indicated in the following Table VI with the specified acid. The treating solutions are at 205–212° F., and the times of treatment is in the range of 15–20 minutes. Panels of aluminum B are used. In addition to subjecting each panel to the "Tape Test" and the "Salt Spray Test," each panel was observed for the formation of a boehmite film. If such a film is formed, the designation "Normal" is set forth in the following table under the column headed "Film Formation"; if no such film is formed the designation is "None."

The results are tabulated as follows:

TABLE VI

| Acid | pH of Solution | Film Formation | Tape Test | Salt Spray Test |
|---|---|---|---|---|
| Boric | 6 | None | Fail | 200+ |
| Citric | 6 | do | do | 200+ |
| Tartaric | 6 | do | do | 200+ |
| Sulfuric | 6 | do | do | 200+ |
| Phosphoric | 6 | do | do | 100+ |
| Nitric | 6 | Normal | Pass | 6 |
| Hydrochloric | 4.6 | do | do | 15 |
| Formic | 6 | do | do | 5 |
| Acetic | 6 | do | do | 14 |
| Monochloroacetic | 6 | do | do | 2 |
| Cyanoacetic | 5.2 | do | do | 23 |
| Propionic | 5.5 | do | do | 15 |
| Butyric | 5.5 | do | do | 20 |
| Trichloroacetic | 6.8 | do | do | 35 |
| Methoxyacetic | 5.4 | do | do | 25 |
| Methanesulfonic | 5.6 | do | do | 20 |
| Controls: | | | | |
| Deionized water alone (pH 4–5) | | do * | do | 48 |
| Deionized water, pH adjusted to 6 with NaOH | | do * | do | 48 |
| Untreated panels | | None | Fail | 200+ |

*These films are translucent with a grayish cast, whereas the films provided using the stated monobasic salts are clear, transparent and colorless.

Example VII

This example illustrates the use of another sulfonic acid in the pretreatment process. Panels of aluminum B and panels of aluminum C, after cleaning as stated previously, are immersed for 2 minutes in a solution, at 160° F., prepared by dissolving in a liter of water: a mixture containing 25.26 grams of p-toluene sulfonic acid, 12.56 grams of boric acid and 7.53 grams of chromic acid; 10 ml. of concentrated nitric acid and 1 gram of a mixture of condensation products of polypropylene glycol and ethylene oxide—90% having a molecular weight of approximately 8000 and 10% having a molecular weight of approximately 1800. After removal from the bath and rinsing with water, the panels are immersed in deionized water at 205–210° F., containing 0.06 M β-hydroxyethylhydrazine acetate adjusted to pH 5.5 with acetic acid. Immersion times of 5 and 10 minutes are used. The results are tabulated as follows:

TABLE VII

| Aluminum | B | | C | |
|---|---|---|---|---|
| Treatment Time (Min.) | 5 | 10 | 5 | 10 |
| Tape Test | P | P | P | P |
| Percent Reflectivity | 100 | 92 | 100 | 99 |
| Salt Spray Test | 12 | 7 | 0 | 0 |

Examples VIII–XII

The following table sets forth other compositions in dry, solid, finely divided form which can be added to water and utilized in the same manner in the pretreat-

TABLE V

| Amine | Aniline | | | | Melamine | | | | Morpholine | | | | Piperidine | | | |
|---|---|---|---|---|---|---|---|---|---|---|---|---|---|---|---|---|
| Aluminum | B | | C | | B | | C | | B | | C | | B | | C | |
| Treatment Time (Min.) | 5 | 10 | 5 | 10 | 5 | 10 | 5 | 10 | 5 | 10 | 5 | 10 | 5 | 10 | 5 | 10 |
| Tape Test | P | P | P | P | P | P | P | P | P | P | P | P | P | P | P | P |
| Salt Spray Test | 14 | 20 | 0 | 0 | 15 | 10 | 0 | 0 | 10 | 3 | 0 | 0 | 24 | 28 | 0 | 0 |
| Percent Reflectivity | 90 | 84 | 82 | 70 | 86 | 75 | 60 | 57 | 100 | 94 | 99 | 100 | 100 | 78 | 100 | 88 | ment process as in Example VII with comparable results (amounts are in percent by weight based on the total weight of the materials specified):

TABLE VIII

|  | VIII | IX | X | XI | XII |
|---|---|---|---|---|---|
| p-Toluene sulfonic acid | 55.7 | | | | |
| p-Nitrotoluene sulfonic acid | | 76.5 | | | |
| 2,5-dichlorobenzene sulfonic | | | 78.0 | | |
| 2-naphthalene sulfonic acid | | | | 85.0 | |
| Sulfosalicyclic acid | | | | | 70.0 |
| Chromic acid | 3.5 | | | | |
| Sodium chromate | | | | | 22.0 |
| Potassium chromate | | | 10.0 | | |
| Sodium dichromate | 16.6 | | | 5.0 | |
| Boric acid | 27.7 | | 12.9 | 10.0 | |
| Sodium borate | | 20.0 | | | |
| Potassium borate | | | | | 8.0 |

Examples XIII–XV

These examples illustrate the effect of the present pretreatment process in conjunction with the present boehmite-producing process as compared to the use of other preliminary preparatory treatments employed in the prior art. In these examples, aluminum B is used. In Examples XIII and XIV the preliminary preparatory treatment are those disclosed "Use of Boehmite Films for Corrosion Protection of Aluminum," by D. G. Altenpohl in Corrosion, National Association of Corrosion Engineers, pp. 143t–153t, April 1962. In Example XIII, the bath is prepared in the proportions of 40 grams of sodium fluoride per liter of 25% nitric acid; panels of aluminum B are immersed therein, at room temperature, for 30 seconds, followed by rinsing first with tap water, next with 50% nitric acid then with tap water and finally with deionized water. In Example XIV, panels of aluminum B are immersed in a 5%, by weight, solution of sodium hydroxide, at room temperature, for 2 minutes. Upon removal from this bath, the panels are rinsed first with tap water, next with 50% nitric acid, then with tap water and finally with deionized water. In Example XV the pretreatment process of Examples I–VI is used.

In each of Examples XIII–XV, the panels, after the final rinse in deionized water, are permitted to stand for 24 hours before being immersed in a bath, at 210° F., of 0.5%, by weight, β-hydroxyethylhydrazine acetate and sufficient excess acetic acid to provide a pH of 6. Treatment times of 5 and 10 minutes are used.

The principal significant improvement is in corrosion resistance, and these Salt Spray Test results are tabulated as follows:

TABLE IX

| Example | Treatment Time (Min.) | Salt Spray Test |
|---|---|---|
| XIII | 5 | 55 |
| | 10 | 35 |
| XIV | 5 | 35 |
| | 10 | 45 |
| XV | 5 | 20 |
| | 10 | 10 |

Examples XVI–XIX

These examples further illustrate improved results, in terms of corrosion resistance, provided by the present boehmite-producing process, by virtue of the present pretreatment process. In Examples XVI and XVII panels of aluminum B are pretreated as in Examples XIII and XIV, respectively, but are immediately subjected to the boehmite-producing process of Examples XIII–XV. In Examples XVIII and XIX panels of aluminum B are pretreated the same as in Examples XVI and XVII, respectively, and then immediately subjected to the pretreatment process used in Examples I–VI. Following this, these panels are subjected to boehmite-producing process of Examples XIII–XV, treatment times of 5 and 10 minutes being used.

Here again, improved boehmite film formation, as shown by increased corrosion resistance, is evident with the aluminum panels subjected to the pretreatment process of the present invention.

The results are tabulated as follows:

TABLE X

| Example | Treatment Time (Min.) | Salt Spray Test |
|---|---|---|
| XVI | 5 | 35 |
| | 10 | 30 |
| XVII | 5 | 45 |
| | 10 | 35 |
| XVIII | 5 | 16 |
| | 10 | 4 |
| XIX | 5 | 15 |
| | 10 | 10 |

EXAMPLE XX

Figure 4:
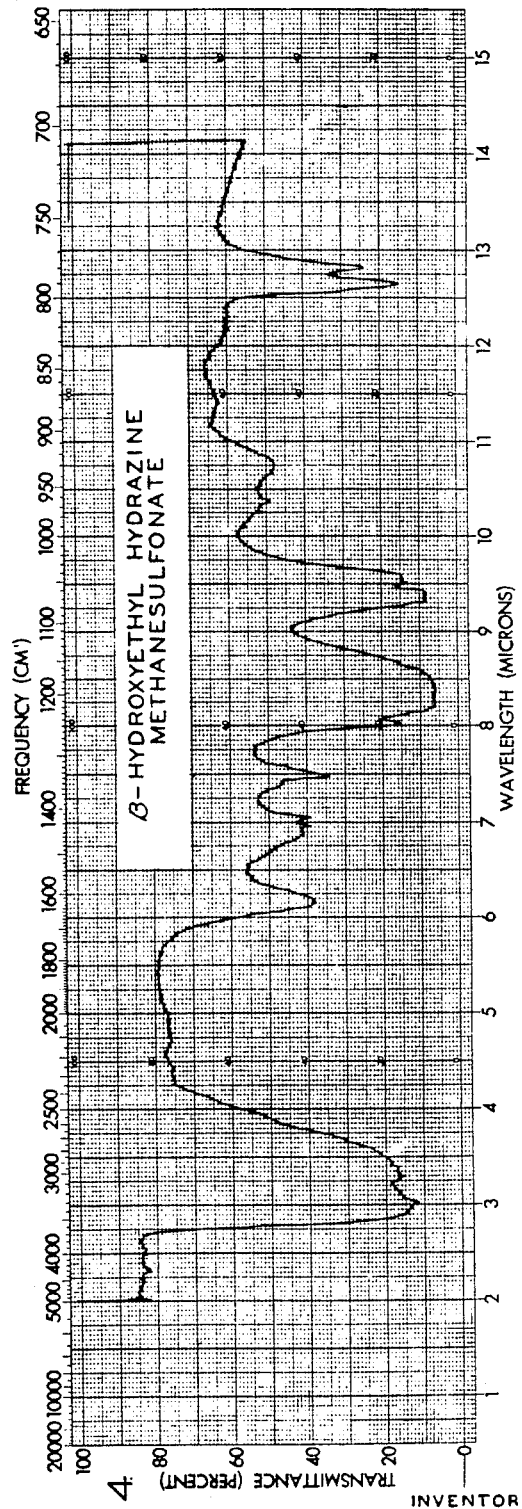

This example illustrates the preparation of β-hydroxyethylhydrazine formate. To 84.07 g. of deionized water at room temperature are added 9.80 g. of β-hydroxyethylhydrazine and 6.13 g. of formic acid. The resulting material in the form of a concentrate having a pH of 5.5, is flash evaporated at 125° F., and at a vacuum of 20–30 mm. Hg for 60 hours until the weight of the material becomes constant at 16.30 g. The product, β-hydroxyethylhydrazine formate, is a viscous, amber-colored liquid. The theoretical weight of formic acid combinable with 9.80 g. of β-hydroxyethylhydrazine is 5.51 g.; the actual weight as determined by difference (16.30–9.80) is 6.50 g. The infared spectrogram for this compound is set forth as FIGURE 1 of the drawing, and the pertinent data for this spectrogram, as well as for those of FIGURES 2–4, are as follows:

| | |
|---|---|
| Prism | Nacl |
| Resolution | 927 |
| Response | 1 |
| Gain | 6 |
| Speed | 4 |
| Suppression | 2 |
| Scale | IX |

EXAMPLE XXI

This example illustrates the preparation of β-hydroxyethylhydrazine acetate. To 81.65 g. of deionized water at room temperature are added 9.80 g. of β-hydroxyethylhydrazine and 8.55 g. of acetic acid. The resulting material in the form of a concentrate having a pH of 5.5, is flash evaporated as in Example XX to a constant weight of 17.70 g. The product, β-hydroxyethylhydrazine acetate, is a viscous, amber-colored liquid. The theoretical weight of acetic acid combinable with 9.80 g. of β-hydroxyethylhydrazine is 7.74 g.; the actual weight as determined by difference (17.70–9.80) is 7.90 g. The infared spectrogram for this compound is set forth as FIGURE 2 of the drawing.

EXAMPLE XXII

This example illustrates the preparation of β-hydroxyethylhydrazine propionate. To 78.26 g. of deionized water at room temperature are added 9.80 g. of β-hydroxyethylhydrazine and 11.94 g. of propionic acid. The resulting material in the form of a concentrate having a pH of 5.5, is flash evaporated as in Example XX to a constant weight of 19.69 g. The product, β-hydroxyethylhydrazine propionate, is a viscous, amber-colored liquid. The theoretical weight of propionic acid combinable with 9.80 g. of β-hydroxyethylhydrazine is 9.42 g.; the actual weight as determined by difference is (19.69–9.80) is 9.89 g. The infrared spectrogram for this compound is set forth as FIGURE 3 of the drawing.

Example XXIII

This example illustrates the preparation of β-hydroxyethylhydrazine methane sulfonate. To 79.18 g. of deionized water at room temperature are added 9.80 g. of β-hydroxyethylhydrazine and 11.02 g. of methane sulfonic acid. The resulting material in the form of a concentrate having a pH of 5.5, is flash evaporated as in Example XX to a constant weight of 22.17 g. The product, β-hydroxyethylhydrazine methane sulfonate, is a solid having a melting point, as determined on a Fisher-Jones apparatus, of 109–113° C. (average of five determinations). The theoretical weight of methane sulfonic acid combinable with 9.80 g. of β-hydroxyethylhydrazine is 12.39 g.; the actual weight as determined by difference (22.17–9.80) is 12.37 g. The infrared spectrogram for the compound is set forth in FIGURE 4 of the drawing.

Examples XXIV–XXVII

These examples illustrate the preparation of further concentrates of β-hydroxyethylhydrazine salts in which combinations of monobasic acids are used. In each case 9.80 g. of β-hydroxyethylhydrazine and 4.75 g. of acetic acid are added to 84.00 g. of deionized water to provide concentrates having a pH of 7.0. These various other acids, as set forth in the following Table XI, are added to reduce the pH to 5.5. Each such concentrate is then diluted to a concentration of 0.06 M β-hydroxyethylhydrazine. Each solution, heated to 205–212° F., is used to treat panels of aluminum B for a treating time of 15 minutes. Each panel is subjected to the "Salt Spray Test" and to the "Tape Test."

The results are tabulated as follows:

TABLE XI

| Example | pH to 5.5 with (acid) | Salt Spray Test | Tape Test |
|---|---|---|---|
| XXIV | Propionic | 3 | Pass. |
| XXV | Methane sulfonic | 2 | Do. |
| XXVI | Nitric | 3 | Do. |
| XXVII | Hydrochloric | 5 | Do. |

SEALING OF POROUS ANODIC OXIDE COATINGS

Reference has been made above to the use of the boehmite-producing process as a novel means of sealing porous anodic oxide coatings on aluminum. The production of porous anodic oxide coatings on aluminum is well known, being described in many publications, for example: "Formation of Anodic Coatings on Aluminum," by J. D. Edwards and F. Keller in Transactions of the Electrochemical Society (1941), 79, 135–141, and "The Structure of Anodic Oxide Coatings" by the same authors in Metals Technology, April 1944 (Tech. Pub. No. 1710 of the American Institute of Mining and Metallurgical Engineers, pp. 1–12) and publications cited therein, to which reference may be made. Such coatings are provided by anodically oxidizing the aluminum in a dilute aqueous solution of an acid which exerts some solvent action on the coating, such as sulfuric acid, oxalic acid, chromic acid and the like. The resulting coating is adsorptive and porous and consists essentially of aluminum oxide. It is common practice to "seal" such coatings by immersing the coated article in a hot water bath, for example at 200–212° F. for 10 to 20 minutes.

It has been found that using the above-described boehmite-producing bath and conditions to seal the porous anodic oxide coating results in a substantially improved sealed coating as compared to those resulting from the prior art sealing treatment. In the sealing treatment, the salt of an ammonia derivative and a monobasic acid and the other materials (e.g. water) and conditions discussed above in connection with the description of the boehmite-producing process, may be employed. However, there may be used concentrations of the salt beyond 5%, up to 10% or even up to 15 to 20%, especially where, during extended use of the bath, additional amounts of the salt are added from time to time to regenerate the usefulness of the bath. The preferred temperature of the bath for the sealing treatment is from about 200° F. to about 212° F.

The mechanism of the improved sealing is not fully understood at the present. Apparently some boehmite is formed at the small exposed areas of aluminum at the sites of the pores. However, it is also believed that boehmite forms on the surfaces of the oxide of the anodic oxide coating since the resulting sealed coating exhibits improved adhesion.

The following examples illustrate the sealing treatment and the improved results achieved thereby:

Example XXVIII

Nine panels of aluminum B and nine panels of aluminum C are treated as follows:

All are subjected to conventional preliminary cleaning and deoxidizing treatments involving inhibited alkaline cleaning, caustic etching and chromic acid deoxidizing, each followed by rinsing. The panels are then anodized in a 15%, by weight sulfuric acid solution in water at 15 volts and 70° F. for 15 minutes. The anodized panels are then rinsed with water.

Three panels of each aluminum type are then immersed in a standard deionized water sealing bath at pH 5.5 for 15 minutes at 210° F. Another three panels of each aluminum type are immersed in the same bath following the addition of β-hydroxyethylhydrazine acetate to a concentration of about 0.5–0.75%, by weight, of the bath. The pH remains at 5.5. Three panels of each aluminum type are simply air dried at 75° F., as are the treated panels, and all panels are then subjected to the Tape Test and the Salt Spray Test.

The results are as follows:

| Sealing Method | Aluminum | Tape Test | Salt Spray Test |
|---|---|---|---|
| None—control | B | F | Pitting type corrosion. |
|  | C | F | Heavy tarnish. |
| Water seal | B | F | Med. gray discolor. |
|  | C | F | Med. tarnish. |
| Present seal | B | P | Slight gray discolor. |
|  | C | P | Light tarnish. |

Example XXIX

Following the foregoing procedure but using twice the concentration of β-hydroxyethylhydrazine acetate (1–1.5%, by weight) and a sealing treatment time of 20 minutes at 212° F. results in sealed anodic oxide coatings that pass the tape test, whereas coatings sealed only in deionized water at 212° F. for 20 minutes, failed.

Modification is possible in the selection of materials for the pretreatment process and for the boehmite-producing process, as well as in the process conditions, procedures and techniques employed without departing from the scope of the present invention.

I claim:

1. In a production of boehmite involving contacting aluminum with water, at a temperature between 75° C. and boiling, the improvement which consists essentially of including in said water a small effective amount of a salt of:
    (1) an ammonia derivative selected from the group consisting of ammonium hydroxide, hydrazine, hydroxylamine and basic amines which, at a concentration of whichever is the least of 0.1 molar and saturation, are capable of:
        (a) producing, in said water, a pH of at least 7.2 and of
        (b) increasing the reduction potential of said water by at least 30 millivolts; and
    (2) a water-soluble monobasic acid;
the resulting solution having a pH, by virtue of monobasic acid present therein, of below 7 but not substantially below 4.

2. The process of claim 1, wherein the water employed has an ohmic resistance above 50,000 ohms per cc., and wherein said ammonia derivative is capable of increasing the reduction potential of said water by at least 200 millivolts.

3. The process of claim 2, wherein the water employed has an ohmic resistance above 100,000 ohms per cc.

4. The process of claim 2 wherein said water is deionized water.

5. The method of claim 2 wherein the concentration of said salt in said water is between about 0.1 and about 2%, by weight.

6. The process of claim 1 wherein said ammonia derivative is β-hydroxyethylhydrazine.

7. The method of claim 1 wherein the concentration of said salt in said water is between about 0.01 and about 3%, by weight.

8. The method of claim 1 wherein the concentration of said salt in said water is between about 0.1 and about 2%, by weight.

9. In the production of a boehmite film on an aluminum surface involving contacting the aluminum surface with water, at a temperature between 75° C. and boiling, until a boehmite film is formed on said surface, the improvement which consists essentially of including in said water a small effective amount of a salt of:
(1) an ammonia derivative selected from the group consisting of ammonium hydroxide, hydrazine, hydroxylamine and basic amines which, at a concentration of whichever is the least of 0.1 molar and saturation, are capable of:
    (a) producing, in said water, a pH of at least 7.2 and of
    (b) increasing the reduction potential of said water by at least 30 millivolts; and
(2) a water-soluble monobasic acid selected from the group consisting of water-soluble monobasic inorganic acids, water-soluble aliphatic monocarboxylic acids containing from 1 to 4 carbon atoms and water-soluble aliphatic monosulfonic acids containing from 1 to 4 carbon atoms, said acid further having a reduction potential at least as great as that of nitric acid;
the resulting solution having a pH, by virtue of monobasic acid present therein, of below 7 but not substantially below 4.

10. The process of claim 9 wherein the water employed has an ohmic resistance above 50,000 ohms per cc., and wherein said ammonia derivative is capable of increasing the reduction potential of said water by at least 200 millivolts.

11. The process of claim 9 wherein the water employed has an ohmic resistance above 100,000 ohms per cc.

12. The method of claim 11 wherein the concentration of said salt in said water is between about 0.1 and about 2%, by weight.

13. The process of claim 9 wherein said water is deionized water.

14. The process of claim 9 wherein the ammonia derivative is β-hydroxyethylhydrazine.

15. The process of claim 14 wherein said monobasic acid is a water-soluble aliphatic monocarboxylic acid containing from 1 to 4 carbon atoms.

16. The process of claim 9 wherein said monobasic acid is a water-soluble aliphatic monocarboxylic acid containing from 1 to 4 carbon atoms.

17. The process of claim 16 wherein said monocarboxylic acid is an acetic acid.

18. The process of claim 17 wherein said acid is acetic acid.

19. The process of claim 16 wherein said monocarboxylic acid is a propionic acid.

20. The method of claim 9 wherein the concentration of said salt in said water is between about 0.01 and about 3%, by weight.

21. The method of claim 9 wherein the concentration of said salt in said water is between about 0.1 and about 2%, by weight.

22. In the production of a boehmite film on an aluminum surface involving contacting the aluminum surface, which is substantially free of oxide, with water, at a temperature between 75° C. and boiling, until a boehmite film is formed on said surface, the improvement which consists essentially of including in said water between about 0.01% and about 5%, by weight, of a salt of:
(1) an ammonia derivative selected from the group consisting of ammonium hydroxide, hydrazine, hydroxylamine and basic amines which, at a concentration of whichever is the least of 0.1 molar and saturation are capable of:
    (a) producing, in said water, a pH of at least 7.2 and of
    (b) increasing the reduction potential of said water by at least 200 millivolts; and
(2) a water-soluble monobasic acid selected from the group consisting of water-soluble monobasic inorganic acids, water-soluble aliphatic monocarboxylic acids containing from 1 to 4 carbon atoms and water-soluble aliphatic monosulfonic acids containing from 1 to 4 carbon atoms, said acid further having a reduction potential at least as great as that of nitric acid;
the resulting solution having a pH, by virtue of monobasic acid present therein, of between about 5.5 and about 6.5.

23. The process of claim 22 wherein said salt is in a concentration of between about 0.1 and about 2% by weight.

24. A composition of matter adapted for addition to water for the treatment of aluminum in the production of boehmite consisting essentially of a solution, in water having an ohmic resistance of above 50,000 ohms per cc., of a salt of β-hydroxyethylhydrazine and a water-soluble monobasic acid selected from the group consisting of water-soluble monobasic inorganic acids, water-soluble aliphatic monocarboxylic acids containing from 1 to 4 carbon atoms and water-soluble aliphatic monosulfonic acids containing from 1 to 4 carbon atoms, said acid further having a reduction potential at least as great as that of nitric acid, said salt being in a concentration between about 10 and about 20%, by weight, and said solution having a pH between about 4 and 6 by virtue of monobasic acid present therein.

25. The composition of claim 24 wherein said monobasic acid is a water-soluble aliphatic monocarboxylic acid having from 1 to 4 carbon atoms.

26. The composition of claim 25 wherein said monocarboxylic acid is acetic acid.

27. In the production of a boehmite film on an aluminum surface involving first removing oxide film from said surface and thereafter contacting the aluminum surface with water, at a temperature between 75° C. and boiling, until a boehmite film is formed on said surface the improvement which consists essentially of first contacting the aluminum surface with hot water containing a sulfonic acid, chromate ions and borate ions in amounts equivalent to dissolving in water, to a concentration of from about 0.3 to about 5%, by weight, a composition consisting essentially of between about 45 and about 96% of a sulfonic acid, between about 1 and about 25% of a chromic acid compound and between about 3 and about 30% of a boric acid compound, said percentages being by weight and based upon the combined weight of the three, until the oxide is removed from said surface, and thereafter contacting the oxide-free aluminum surface with water, at a temperature between 75° C. and boiling containing a small effective amount of a salt of:
(1) an ammonia derivative selected from the group consisting of ammonium hydroxide, hydrazine, hydroxylamine and basic amines which, at a concentration of whichever is the least of 0.1 molar and saturation, are capable of:
    (a) producing, in said water, a pH of at least 7.2 and of
    (b) increasing the reduction potential of said water by at least 30 millivolts; and (2) a water-soluble monobasic acid selected from the group consisting of water-soluble monobasic inorganic acids, water-soluble aliphatic monocarboxylic acids containing from 1 to 4 carbon atoms and water-soluble aliphatic monosulfonic acids containing from 1 to 4 carbon atoms, said acid further having a reduction potential at least as great as that of nitric acid;
the resulting solution having a pH, by virtue of monobasic acid present therein, of below 7 but not substantially below 4, until a boehmite film is formed on said aluminum surface.

28. In the treatment of an aluminum surface to remove oxide film therefrom the improvement which consists essentially of contacting the aluminum surface with a hot water bath containing a sulfonic acid, chromate ions and borate ions in amounts equivalent to dissolving in water, to a concentration of from about 0.3 to about 5%, by weight, a composition consisting essentially of between about 45 and about 96% of a sulfonic acid, between about 1 and about 25% of a chromic acid compound and between about 3 and about 30% of a boric acid compound, said percentages being by weight and based upon the combined weight of the three, until the oxide is removed from said surface.

29. The process of claim 28 wherein the sulfonic acid provides a pH in water of below 4.

30. The process of claim 28 wherein nitric acid is also included in the bath; and wherein the bath has a pH between about 0.5 and about 2.

31. A composition of matter especially adapted for addition to water for the treatment of aluminum surfaces to remove oxide therefrom consisting essentially of dry, solid, finely-divided water-soluble sulfonic acid in an amount between about 45 and about 96%; a dry, solid, finely-divided water-soluble chromic acid compound in an amount between about 1 and about 25%; and a dry, solid, finely-divided water-soluble boric acid compound in an amount between about 3 and about 30%, said percentage being by weight and based on the combined weight of the three stated ingredients.

32. The composition of claim 31 wherein said chromic acid compound is selected from the group consisting of an alkali metal chromate and chromic acid; and wherein the boric acid compound is selected from the group consisting of an alkali metal borate and boric acid.

33. In the sealing of porous anodic oxide coatings on aluminum involving contacting such coating with water, at a temperature between 75° C. and boiling, the improvement which consists essentially of including in said water a small effective amount of a salt of:
(1) an ammonia derivative selected from the group consisting of ammonium hydroxide, hydrazine, hydroxylamine and basic amines which, at a concentration of whichever is the least of 0.1 molar and saturation, are capable of:
(a) producing, in said water, a pH of at least 7.2 and of
(b) increasing the reduction potential of said water by at least 30 millivolts; and
(2) a water-soluble monobasic acid selected from the group consisting of water-soluble monobasic inorganic acids, water-soluble aliphatic monocarboxylic acids containing from 1 to 4 carbon atoms and water-soluble aliphatic monosulfonic acids containing from 1 to 4 carbon atoms, said acid further having a reduction potential at least as great as that of nitric acid;
the resulting solution having a pH, by virtue of monobasic acid present therein, of below 7 but not substantially below 4.

34. The process of claim 33 wherein the water employed has an ohmic resistance above 100,000 ohms per cc., and wherein the temperature is at least about 200° F., and wherein said ammonia derivative is capable of increasing the reduction potential of said water by at least 200 millivolts.

35. The process of claim 34 wherein said ammonia derivative is $\beta$-hydroxyethylhydrazine.

References Cited

UNITED STATES PATENTS

| | | | |
|---|---|---|---|
| 1,946,147 | 2/1934 | Bengsten | 204—58 X |
| 2,108,604 | 2/1938 | Mason | 204—58 X |
| 2,703,781 | 3/1955 | Hesch | 204—58 X |
| 1,384,033 | 7/1921 | Norton | 148—6.27 |
| 1,551,613 | 9/1925 | Pacz | 148—6.27 |
| 1,846,844 | 2/1932 | Clark | 148—6.27 |
| 2,371,133 | 3/1945 | Graenacher et al. | 260—583 |
| 2,496,649 | 2/1950 | Zelley | 148—6.27 X |
| 2,945,778 | 7/1960 | Lipinski | 148—6.24 |
| 2,966,462 | 12/1960 | Spindt et al. | 260—583 X |
| 3,005,027 | 10/1961 | Druey et al. | 260—583 X |
| 3,210,184 | 10/1965 | Uhlig | 204—35.1 |

FOREIGN PATENTS

| | | |
|---|---|---|
| 741,337 | 11/1943 | Germany. |
| 776,113 | 6/1957 | Great Britain. |
| 197,306 | 1924 | Great Britain. |

OTHER REFERENCES

Burns et al.: Protective Coatings for Metals, 2nd ed., 1955, Reinhold Pub. Corp., p. 559.

Gever et al.: J. Organic Chem. (1949), vol. 14, pp. 816, 817.

Tajima et al.: Metal Finishing, September 1953, pp. 69–73.

RALPH S. KENDALL, *Primary Examiner.*

UNITED STATES PATENT OFFICE
CERTIFICATE OF CORRECTION

Patent No. 3,380,860                                          April 30, 1968

Richard J. Lipinski

It is certified that error appears in the above identified patent and that said Letters Patent are hereby corrected as shown below:

Column 2, line 66, "reuslting" should read -- resulting --. Column 7, line 36, "organic" should read -- inorganic --; line 75, cancel "sufficient monobasic acid will be added to provide the de-". Column 8, line 1, after "water," insert -- sufficient monobasic acid will be added to provide the de- --. Column 10, line 58 "TABLE II" should read -- TABLE III --. Column 11, line 67, "5 to 10 minutes" should read -- 5 and 10 minutes --. Column 13, TABLE VIII, fourth column, line 10, "12.9" should read -- 12.0 --. Column 16, line 65, after "acid" insert -- selected from the group consisting of water-soluble monobasic inorganic acids, water-soluble aliphatic monocarboxylic acids containing from 1 to 4 carbon atoms and water-soluble aliphatic monosulfonic acids containing from 1 to 4 carbon atoms, said acid further having a reduction potential at least as great as that of nitric acid --.

Signed and sealed this 25th day of November 1969.

(SEAL)
Attest:

EDWARD M. FLETCHER, JR.                          WILLIAM E. SCHUYLER, JR.
Attesting Officer                                      Commissioner of Patents